Patented Feb. 27, 1945

2,370,346

UNITED STATES PATENT OFFICE 2,370,346

PURIFICATION OF STYRENE

Earl W. Gluesenkamp, Centerville, Ohio, assignor to Monsanto Chemical Company, a corporation of Delaware No Drawing. Application December 22, 1941, Serial No. 423,957

12 Claims. (Cl. 260—669)

This invention relates to the purification of styrene, and deals particularly with the purification of monomeric styrene which contains small amounts of products arising from the oxidation of styrene by reason of exposure to air as during manufacture or as occasioned during storage or shipment.

The auto-oxidizable nature of styrene is well-known. Under conditions of storage, even in the presence of so-called polymerization inhibitors, such as hydroquinone, p-tertiary butylcatechol, etc., monomeric styrene is partially converted into oxidized hydrocarbons comprising aldehydes and organic peroxides, the presence of which have a decided influence on the course of its subsequent polymerization. Thus, Stobbe and Posnjak (Ann. 371, 259 (1909)) have observed that styrene which had been allowed to stand for two weeks was much more rapidly polymerized than freshly distilled styrene, probably because of auto-oxidation of the former. Stobbe (J. prakt. Chem. 90, 551 (1914)) has also noted that styrene which had been exposed to light in the presence of oxygen gave benzaldehyde and formaldehyde, as well as polymeric styrene.

In order that the polymerization of monomeric styrene be properly controlled, it is desirable that the oxidized hydrocarbons, comprising styrene oxides, peroxides and the aldehydic bodies that result from the decomposition thereof, be removed or substantially reduced in the monomeric styrene before undertaking the polymerization step. Although the exact nature of the reactions occurring in the production of the polymerization products of styrene has not been established, it is believed by some, that the polymerizing reaction may comprise at its inception the formation of activated molecules in which the oxygenated bodies in the monomeric styrene take part.

It is an object of this invention to provide a process for purifying off-grade styrene, that is styrene contaminated with small amounts, say up to 1%, of oxidized hydrocarbons comprising styrene oxides and peroxides and the decomposition products thereof by removing said oxidized hydrocarbons from such off-grade material. Still another object is the removal or substantial reduction of such oxidized hydrocarbons contained in monomeric styrene in such a manner that the quality of the monomeric styrene, itself, is not adversely affected thereby.

The styrene herein treated is ordinarily of a high degree of purity, being usually at least 95% monomeric styrene, and as a matter of fact, may even be of higher purity, that is 98% to 99% pure. Any non-styrene hydrocarbons present are usually ethyl benzene or related hydrocarbons. The material is moreover, free of non-hydrocarbon material such as chlorine containing hydrocarbons. Water is preferably to be avoided in the styrene treated, and the herein described treatment conducted in the anhydrous state.

Attempts to purify off-grade styrene by distillation have not been particularly successful, for the aldehydic bodies are volatilized and pass out with the monomeric styrene into the distillate. To a certain extent, the styrene oxides or peroxides remain in the distillation residue; however, during the distillation there may be continuous decomposition or conversion of such oxides or peroxides into volatile aldehydic bodies with resultant contamination of the product during fractional distillation. Washing treatments of the off-grade styrene are generally ineffective, repeated washing at room temperature of the off-grade styrene with water, ammonium hydroxide, or aqueous sodium bisulfite showing a decrease in the aldehydic content only after laborious, time-consuming treatments. It was moreover, to be expected that the attempted removal, at higher temperatures, of aldehydic impurities from off-grade styrene by selective reaction of said aldehydic constituents with an added reactant would meet with little success, for styrene, itself, is so reactive that the added reactant would be expected to condense with the styrene as well as with, or instead of, the aldehydic material. Moreover, being easily polymerized under the influence of heat, any attempted selective reaction of the aldehydic constituents requiring the application of heat would be expected to result in at least partial polymerization of the styrene.

We have found, however, that under carefully controlled conditions, certain organic amines unite with the aldehydic constituents of monomeric styrene having an aldehyde content of, say, up to 1% to form substantially stable, non-volatile compounds which may be separated from the monomeric styrene by distillation of the latter, the quality and the quantity of the monomeric styrene contained in the initial material being substantially unaffected by such treatment.

According to this invention, impure styrene containing oxygenated compounds such as styrene oxide, peroxide and aldehydes, such as may normally be developed in styrene exposed to air or oxygen during storage and handling, is treated with an amine, under conditions to effect a reaction between the impurities present, after which the styrene in pure form is recovered from the mixture by distillation. The amount of amine added to styrene will depend somewhat upon the amount of impurities present, and the conditions of treatment employed. In general, the greater the proportion of impurities present, in the styrene the greater is the quantity of amine required.

While I do not completely understand the mechanism of the reactions employed, it is believed that a condensation of the aldehyde with the amine takes place, with the formation of a stable product of high boiling point. A complete formation of the aldehyde-amine condensation product (or other products which may be formed) is effected by employing an excess of the particular amine. Monomeric styrene, which has become contaminated with oxygenated products, will ordinarily contain from 0.05% to 0.10% of total aldehydes calculated as benzaldehyde, although often more may be present. While some of the aldehyde formed may be present as benzaldehyde or other aldehydes another part thereof may be present as formaldehyde. In some cases oxidized styrene may also contain styrene oxide or peroxide, which upon heating may be converted to aldehydes. By removal of the aldehydes as such, as by the addition of the amine, the conversion of the oxides and peroxides may be greatly facilitated and hence the removal of these bodies is also an object of the present invention.

The amine to be added should be soluble in the styrene at least at the treating temperature. I may add as much as 5% but generally find that smaller amounts are sufficient, provided an excess of amine, based upon the amount reacted with the aldehyde is added. Generally 0.1% or 0.2% of amine is sufficient for most contaminated styrene, but this may be increased to 0.5% or even 1%. The treatment may be carried out batchwise or in a continuous manner. When operating in a continuous manner, the oxidized styrene may be treated with the amine in a separate vessel provided with stirring arrangements and also preferably provided with heating devices. The treatment may be carried out at atmospheric pressure or at reduced pressure, in which case it may be desirable to provide the treating vessel with a reflux condenser and allow the solution to reflux gently at diminished pressure in order to react the aldehyde with the amine. The treated solution of styrene is then distilled in a distillation column, the pure styrene being recovered as a distillate in polymerizable form, while the amine-aldehyde condensation product together with excess amine is withdrawn as a residue from the bottom of the still.

I have found that organic amines and preferably high boiling amines of the primary or secondary type, that is amines in which the N-hydrogen is unsubstituted or only partially substituted, fulfill the requirements noted above. As examples of compounds of this type may be mentioned o-, m-, and p-amino-biphenyl, alpha- and beta-naphthylamine, aniline, toluidine, xylidine, diphenylamine, phenetidine, laurylamine, 1-amino-anthraquinone, the N-mono-alkylanilines, the amino-hydroxy-biphenyls, N-benzyl aminophenol, carbazole, etc. The boiling point of the amine should differ from that of styrene, preferably by a substantial amount in order to make possible an easy separation of the styrene. In those cases where the amine boils below styrene, the excess amine may be first removed, after which the styrene recovered. The boiling point difference will be dependent upon the type of distillation equipment employed, for ordinary distilling apparatus the boiling point difference should be at least 30° C. and preferably higher. When efficient fractionating equipment is available, a difference in boiling points of as little as 10° C. is practical.

By refluxing off-grade styrene containing oxidized hydrocarbons comprising styrene oxides and peroxides and the aldehydic decomposition products thereof, with organic amines having the above-mentioned characteristics, at ordinary or elevated temperatures, for a period of time in order to effect a reaction between the aldehydic constituents of said off-grade styrene and the organic amines to give stable, substantially non-volatile products which can be removed from the treated monomeric styrene by distillation of the latter from the reaction mixture. The time is desirably sufficient only to make the reaction take place, without causing an appreciable amount of polymerization of the styrene. Temperatures are preferably maintained at ordinary or slightly elevated temperatures usually below 120° C. The refluxing process and the subsequent distillation of the monomeric styrene from the reaction mixture does not diminish the quantity of monomeric styrene originally present in the off-grade styrene thus treated. The monomeric styrene after treatment according to this invention is substantially free of aldehydic bodies and may be polymerized by customary methods to give products of improved characteristics.

The following examples illustrate, but do not limit, the nature of this invention:

Example 1

A 200 g. sample of monomeric styrene, obtained by pyrolysis of ethylbenzene and substantially free from non-hydrocarbon materials such as chlorine but having an aldehyde concentration of 0.093%, calculated as benzaldehyde, was mixed with 10.0 g. (5%) of beta-naphthylamine. A blue-red color formed upon solution of the amine, and the mixture was refluxed for about 20 minutes under full water pump pressure. The temperature will ordinarily be in the neighborhood of 55° C.–60° C. At the end of about 20 minutes, the monomeric styrene was slowly distilled off from the reaction mixture. Analysis of the distilled styrene gave an aldehyde content of 0.0138% calculated as benzaldehyde. The styrene recovered in good yield could be readily polymerized by the ordinary methods.

Example 2

200 g. of styrene containing aldehydes as in Example 1, was refluxed with 10 g. of diphenylamine by boiling at a pressure of 20 mm. of mercury, and then distilled as in Example 1 to give a monomeric styrene containing 0.035% of aldehydes.

Example 3

Monomeric styrene, obtained by pyrolysis of ethylbenzene and having an aldehyde concentration of approximately 0.5%, calculated on benzaldehyde, was admixed with 5% of its weight of p-aminobiphenyl. The mixture was refluxed under a vacuum at a pressure of 20 to 25 mm. of mercury for 15 minutes and at the end of this time the styrene was slowly distilled off from the reaction mixture. Analysis of the distilled styrene gave an aldehyde content of 0.0316%.

*Example 4*

The procedure of Example 3 was followed, except that 5% of o-aminobiphenyl was used instead of the isomeric aminobiphenyl of Example 3. A monomeric styrene having an aldehyde content of 0.038% was obtained.

*Example 5*

200 g. of the aldehydic styrene of Example 1 was refluxed with 5% of its weight of o-phenetidine for 10 to 15 minutes under full water pump pressure, and at the end of this time the monomeric styrene was slowly distilled off from the reaction mixture. Analysis of the distilled styrene gave an aldehyde content of 0.023%.

By successive treatments, or by a prolonged treatment carried out as described, the aldehyde content may be still further reduced, should this be desirable. For most purposes, however, one treatment may generally be relied upon to so reduce the aldehyde, and peroxide content of the styrene so that little or no disturbance will result therefrom during polymerization.

What I claim is:

1. The process which comprises adding to monomeric styrene containing small amounts of oxidation products of styrene, a small quantity of an amine, reacting said amine with said oxidation products and distilling to recover substantially pure styrene.

2. The process which comprises adding to monomeric styrene containing small amounts of impurities such as oxides of styrene and aldehydes, a quantity of an amine having a boiling point differing from that of styrene, reacting said impurities with said amine and thereafter separating said styrene from said amine by distillation.

3. The process which comprises dissolving in monomeric styrene containing small amounts of aldehydic oxidation products of styrene, a quantity of an amine having a boiling point above that of said styrene, heating the resulting solution to effect a reaction between said oxidation products and said amine, and thereafter distilling the styrene from said reaction product.

4. The process which comprises dissolving in monomeric styrene containing small amounts of oxides of styrene as an impurity, a quantity of an amine having a boiling point above that of said styrene, heating the resulting styrene solution to decompose said oxides of styrene to form decomposition products and to react said decomposition products with said amine, and then distilling said styrene from said amine and recovering the same in pure form.

5. The process defined in claim 4 in which the styrene is maintained in a substantially anhydrous condition.

6. The process defined in claim 4 in which the amine is added in an amount up to 5% by weight of the styrene.

7. The process which comprises adding to monomeric styrene containing small amounts of oxygenated compounds as impurity, an amine selected from the class consisting of ortho-, meta- and para-aminobiphenyl, alpha and beta-naphthylamine, aniline, toluidine, xylidine, diphenylamine, phenetidine, laurylamine, 1-amino-anthraquinone, the N-mono-alkyl anilines, amino-hydroxybiphenyl, N-benzylaminophenol, carbazol, heating said styrene together with said amine under reduced pressure to effect a reaction between said oxygenated compounds and said amine and thereafter distilling said styrene and recovering the same in purified form.

8. The process defined in claim 7 in which the amine added to said styrene is added in amount up to 5% by weight of said styrene.

9. The process defined in claim 7 in which the amine is added in amount so as to furnish an excess of said amine after reaction with said oxygenated compounds.

10. The process which comprises adding to monomeric styrene containing small amounts of aldehydic bodies an amine selected from the class consisting of ortho-, meta- and para-aminobiphenyl, alpha and beta-naphthylamine, aniline, toluidine, xylidine, diphenylamine, phenetidine, laurylamine, 1-amino-anthraquinone, the N-mono-alkyl anilines, amino-hydroxybiphenyl, N-benzylaminophenol, carbazol, then heating said styrene together with said added amine to effect a reaction between said aldehydic bodies and said amine, and thereafter recovering said styrene by distillation.

11. The process defined in claim 10, in which the reaction is effected by boiling under a reduced pressure.

12. The process defined in claim 10, in which as much as 5% of said amine, based upon the styrene treated, is added.

EARL W. GLUESENKAMP.